United States Patent
Lünnemann et al.

(10) Patent No.: US 9,609,111 B2
(45) Date of Patent: Mar. 28, 2017

(54) METHOD FOR COMMUNICATING BETWEEN A COMMUNICATIONS UNIT OF A DEVICE AND AN EXTERNAL COMMUNICATIONS UNIT VIA A MOBILE PHONE UNIT

(71) Applicant: VOLKSWAGEN AG, Wolfsburg (DE)

(72) Inventors: Patrick Lünnemann, Berlin (DE); Carsten Dietze, Schwülper (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 15/151,598

(22) Filed: May 11, 2016

(65) Prior Publication Data

US 2016/0337500 A1    Nov. 17, 2016

(30) Foreign Application Priority Data

May 11, 2015  (DE) .......................... 10 2015 208 672
Nov. 24, 2015  (DE) .......................... 10 2015 223 229

(51) Int. Cl.
| | |
|---|---|
| H04M 1/00 | (2006.01) |
| H04B 1/38 | (2015.01) |
| H04M 1/725 | (2006.01) |
| H04L 29/06 | (2006.01) |
| H04W 4/00 | (2009.01) |
| H04W 76/02 | (2009.01) |

(52) U.S. Cl.
CPC ........ *H04M 1/72527* (2013.01); *H04L 69/16* (2013.01); *H04L 69/22* (2013.01); *H04W 4/008* (2013.01); *H04W 76/02* (2013.01)

(58) Field of Classification Search
CPC ..... H04W 88/02; H04W 8/245; H04W 24/02; H04W 84/18; H04W 88/06; H04W 76/02; H04M 1/72527; H04M 1/72522; H04M 1/7253; G06F 1/1632
USPC ............... 455/41.1, 41.2, 41.3, 414.1, 414.2, 455/418–420, 550.1, 557, 575.1, 575.9
See application file for complete search history.

(56) References Cited

U.S. PATENT DOCUMENTS

| | | |
|---|---|---|
| 2005/0025161 A1 | 2/2005 | Spooner |
| 2010/0014459 A1 | 1/2010 | Mir et al. |
| 2014/0068713 A1* | 3/2014 | Nicholson ............. H04W 12/06 726/3 |

(Continued)

FOREIGN PATENT DOCUMENTS

| | | |
|---|---|---|
| DE | 102010007883 A1 | 8/2011 |
| EP | 1914954 A1 | 4/2008 |
| WO | 2005004431 A2 | 1/2005 |

*Primary Examiner* — Nhan Le
(74) *Attorney, Agent, or Firm* — Barnes & Thornburg LLP

(57) ABSTRACT

A method for communicating between a communication unit of an apparatus and an external communication unit via a mobile telephone unit wherein a serial connection to be set up between the communication unit of the apparatus and the mobile telephone unit, a protocol of the serial connection having a data field and a first header, for a connection to be set up between the mobile telephone unit and the external communication unit, for a second header for the connection to be generated from the first header in the mobile telephone unit, and for the data field to be transmitted without change from the serial connection to the connection. Also disclosed is an online connection of a mobile telephone unit even without a TCP/IP connection.

18 Claims, 2 Drawing Sheets

(56) References Cited

U.S. PATENT DOCUMENTS

2014/0070925 A1* 3/2014 Shin ................ H04L 67/303
340/12.5

* cited by examiner

METHOD FOR COMMUNICATING BETWEEN A COMMUNICATIONS UNIT OF A DEVICE AND AN EXTERNAL COMMUNICATIONS UNIT VIA A MOBILE PHONE UNIT

PRIORITY CLAIM

This patent application claims priority to German Patent Application Nos. 10 2015 208 672.0, filed 11 May 2015, and 10 2015 223 229.8, filed 24 Nov. 2015, the disclosures of which are incorporated herein by reference in their entirety.

SUMMARY

Illustrative embodiments relate to a method for communicating between a communication unit of an apparatus and an external communication unit via a mobile telephone unit, to a communication unit and to a computer program product.

BACKGROUND

For data connection between mobile telephones and apparatuses, for example, vehicles, the so-called head unit (apparatus unit), is restricted in some markets. Service providers for mobile telephone units, for example, mobile telephones or smartphones, may contractually or technically restrict particular services, for example, during so-called tethering in which the mobile telephone assumes the role of a modem. However, many services on the head unit are based precisely on this connection.

Various serial protocols which can be used for interchanging data between a vehicle and a mobile telephone, for example Bluetooth Serial Port Profile, Android Open Accessory Protocol or IOS External Accessories, do not provide a native TCP/IP (Transmission Control Protocol/Internet Protocol) connection. As a result of the lack of direct TCP/IP support, services which are dependent on an online connection cannot be used in markets or mobile telephones which do not provide tethering.

There are also apparatuses, for example household appliances, which do not contain a TCP/IP interface, with the result that such apparatuses cannot set up an online connection via the TCP/IP protocol.

If there is no tethering activation, customers must enable tethering on the smartphone by purchasing corresponding options from the mobile radio provider. If there is no tethering option, the situation may arise in which the customer must purchase a new mobile telephone if he wishes to use the full functionality of a vehicle.

Disclosed embodiments provide an online connection by means of a mobile telephone unit even without a TCP/IP connection. Disclosed embodiments provide a method, a communication unit, and a computer program product.

BRIEF DESCRIPTION OF THE DRAWINGS

Disclosed embodiments are explained below using the associated drawings, in which.

DETAILED DESCRIPTION OF THE DISCLOSED EMBODIMENTS

Figure 1:
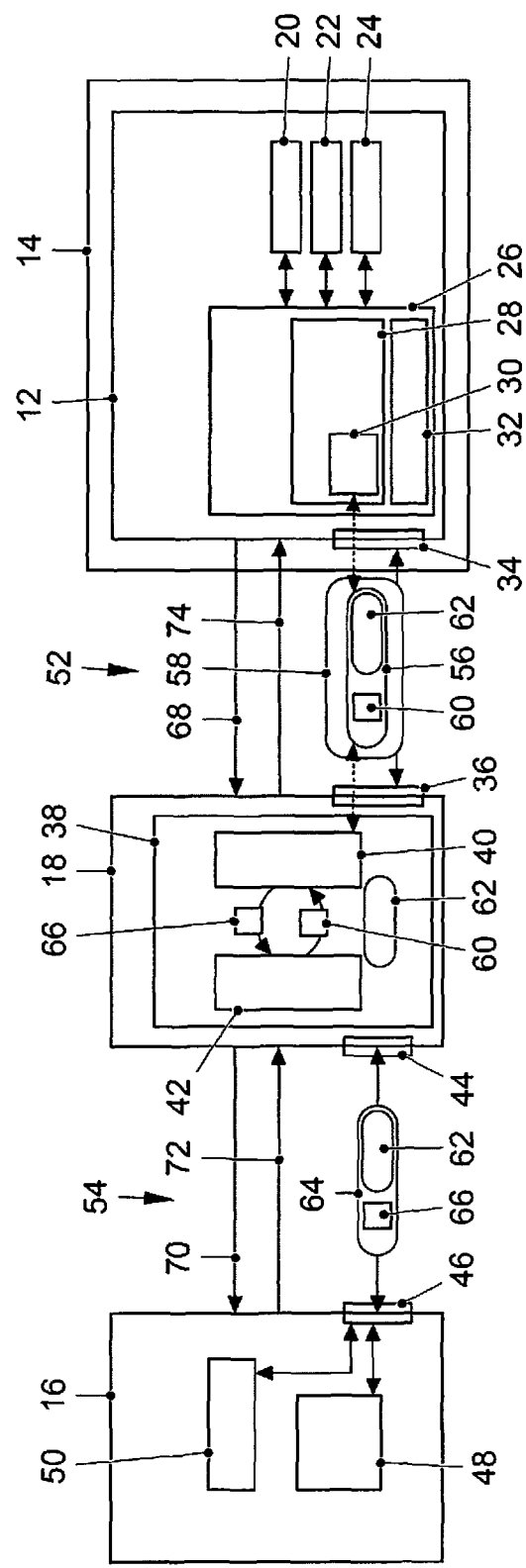
FIG. 1 shows a schematic illustration of a system and a method for communicating between a communication unit of an apparatus and an external communication unit.

The disclosed method for communicating between a communication unit of an apparatus and an external communication unit via a mobile telephone unit provides for a serial connection to be set up between the communication unit of the apparatus and the mobile telephone unit, a protocol of the serial connection having a data field and a first header, for a connection to be set up between the mobile telephone unit and the external communication unit, for a second header for the connection to be generated from the first header in the mobile telephone unit, and for the data field to be transmitted without change from the serial connection to the connection.

Disclosed embodiments provide a gateway or a communication connection for data between a communication unit of an apparatus such as a vehicle, for example an infotainment or navigation system, and an external communication unit, for example a backend of the vehicle manufacturer. In this case, a mobile telephone unit such as a smartphone belonging to the driver is used as the interface. The system operates in a comparable manner to a router, the data contents being transmitted from one protocol to another or from one connection to another in the smartphone, by a software program or an app there, without the contents being changed or known. The security risk is therefore exactly the same as in a smartphone which provides a hotspot and operates as a Wifi router. The risk is no greater than in conventional Wifi tethering.

A possible encrypted connection, for example via HTTPS, between the communication unit of the vehicle and the external communication unit is not affected. A private key for the connection is only in the external communication unit, and the communication unit of the vehicle check the communication partner for validity, as usual. Therefore, despite conversion or the interface in the smartphone, there is a transparent connection between the two end points.

The widespread TCP connection (Transmission Control Protocol), for example, is used for communication between the external communication unit and the smartphone. A serial connection is set up between the communication unit of the vehicle and the mobile telephone unit, a protocol of the serial connection having a data field and a header or header field. The serial connection is implemented, for example, using an accessory protocol such as AOAP (Android Open Accessory Protocol) or iAP2 (Apple Accessory Protocol). These are connections or protocols which allow a connection to further apparatuses, for example via USB. It has been shown that this protocol is not subject to any restrictions with respect to tethering. The invention therefore allows a continuous communication connection to be provided despite tethering. The software or app or interface on the smartphone translates the headers or adapts them between the two connections to the vehicle and to the external communication unit, for example in the backend. In other words, the header of the serial connection and the software/gateway are set up to generate one or more TCP headers, with the result that a data connection which is transparent to the end points is produced, the data field(s) being left unchanged in this case.

In the disclosed method, no costs arise for additional hardware. This solution can also be installed subsequently on commercially available telephones, for example, by means of an app, and does not require any specific version of a telephone. It is, therefore, possible to easily provide a TCP/IP connection for an apparatus which does not have such an interface but has an interface of a serial connection. This serial service is transferred or converted, using the newly presented protocol or its software, to a further service which is not controlled by the apparatus, such as a packet-based service, a packet-based connection or a client/server connection.

The serial connection may comprise a protocol according to Bluetooth Serial Port. Many apparatuses, such as vehicles or household appliances, and many mobile telephone units, for example smartphones, tablets and the like, have an interface or communication unit for a Bluetooth protocol, for example Bluetooth LE (Low Energy). This allows the method to be easily implemented.

The serial connection may comprise an accessory protocol of the mobile telephone unit. An accessory protocol, for example Android Open Accessory Protocol or IOS External Accessories, is widespread at least in mobile telephone units. It may likewise already be implemented in the apparatus or may be easily implemented as an additional protocol, for example by means of a software routine. This implementation can already be carried out when producing the apparatus or by means of a software update.

The serial connection may comprise a USB connection. In addition to the wireless serial connections described above, a wired serial connection can also be used, for example a USB connection. The new protocol of the serial connection is then transmitted or used via the USB interface.

The connection may be a TCP/IP connection. This packet-based connection is reliable and is widespread for providing online access.

The connection and/or the serial connection may be encrypted. This encryption may comprise the encryption of the two communication paths between the apparatus and the mobile telephone unit and between the mobile telephone unit and the external communication unit. The conversion between the two protocols on these connections is likewise secure thanks to the protocol structure. This is because only the headers, also called additional information or meta data, of the data transmission are processed in the mobile telephone unit, while the data field(s) remain(s) unchanged.

Provision may be made for an operation of setting up a communication connection between the communication unit of the apparatus and the external communication unit to involve the communication unit sending a socket request to the mobile telephone unit via the serial connection, the mobile telephone unit transmitting a message for providing a socket to the external communication unit via the connection, the external communication unit transmitting a message relating to the provided socket to the mobile telephone unit via the connection and the mobile telephone unit transmitting a message relating to the provided socket to the communication unit via the serial connection. A socket may also be referred to as a communication end point. They form the interface between the transmission protocol and further software. An apparatus which cannot natively access online services can be enabled for precisely this functionality via the conversion on the mobile telephone unit using the steps mentioned above.

The disclosed communication unit set up for use in an apparatus means that the communication unit is set up to carry out a method as described above. The same advantages and modifications as those described above apply.

A socket may be provided for the serial connection. Both the mobile telephone unit and the communication unit can be prepared for the new protocol using a socket which can be easily installed.

The apparatus may be a vehicle. Since online services for vehicles often resort to mobile telephone units carried in the vehicle, but the tethering required for this purpose is not always available, the present method is suitable for vehicles, in particular.

The apparatus may be a household appliance. For example, household appliances such as washing machines or refrigerators might only have Bluetooth communication but are dependent on an online connection. The present method is also suitable in this case.

The disclosed computer program product which can be loaded into the internal memory of a digital computer comprises software code components which are used to carry out the method as described above when the product is executed on a computer, on a communication unit as described above or on a mobile telephone unit. The same advantages and modifications as those described above apply.

The various embodiments mentioned in this application can be combined with one another unless stated otherwise in the individual case.

FIG. 1 shows a schematic illustration of a system 10 for communicating between a communication unit 12 of an apparatus 14 and an external communication unit 16 via a mobile telephone unit 18.

The apparatus 10 may be a vehicle, for example an automobile, a truck, a motorcycle, a bus or a train. All land vehicles, aircraft and watercraft are considered to be a vehicle here. In a vehicle, the communication unit 12 may be a control apparatus, for example for an infotainment unit. The apparatus 10 may also be a household appliance, for example also in a smart-home group.

The external communication unit 16 may be a backend, that is to say a server structure, of a service provider, for example at the apparatus manufacturer or commissioned by the apparatus manufacturer. The external communication unit 16 may be arranged in one structure, as illustrated, or may be distributed among a plurality of structures.

The mobile telephone unit 18 may be, for example, a smartphone, a tablet or the like. It may also be a portable computer.

The communication unit 12 contains a plurality of features or functionalities 20, 22, 24, for example navigation or traffic status, which communicate with the external communication unit 16. For this purpose, they are connected to the core services 26 of the communication unit 12 which are implemented using hardware and/or software. A network manager 28 which sets up and operates the communication connections is provided within the core services 26. An SPL (Socket Proxy Layer) socket 30 or port is implemented there and sets up, clears and maintains an SPL connection. An Accessory Protocol Support 32 is provided in order to ensure compatibility with the accessory protocols. The SPL socket 30 and the Accessory Protocol Support 32 are implemented using hardware and/or software. The communication unit 12 also contains a serial interface 34 which is in the form of a USB (Universal Serial Bus) interface here in this example.

The SPL socket 30 is connected to the serial interface 34 and communicates with the mobile telephone unit 18 via the serial interface 34.

The mobile telephone unit 18 has a corresponding or compatible serial interface 36. Software 38 which is set up to handle the communication has access to this interface 36. The software 38 contains an SPL socket 40 which is compatible with the SPL socket 30 of the communication unit 12. Both SPL sockets 30, 40 may be identical or, if necessary, may be adapted to the respective operating system or the respective interface 34, 36. The software 38 also contains a TCP socket 42 which handles TCP/IP communication between the mobile telephone unit 18 and the backend 16. For this communication, the mobile telephone unit 18 comprises a further interface 44, to which the software, specifically the TCP socket 42, has access. All of the interfaces or connections mentioned here are bidirectional, with the result that communication is possible in both directions. The interface 44 is here, for example, an interface according to a mobile radio standard, for example 2G, 3G, LTE or 4G.

The external communication unit 16 contains a corresponding or compatible interface 46. This interface 46 is the entry point to the external communication unit 16 and grants access to or communication with a plurality of features or functionalities 48 and 50. These functionalities comprise databases, security facilities such as encryption, navigation services etc.

The communication participants, namely the communication unit 12, the mobile telephone unit 18 and the external communication unit 16, were described above. The connections and the communication between the participants are described below.

A serial connection 52 according to the SPL (Socket Proxy Layer) protocol has been or is set up between the communication unit 12 and the mobile telephone unit 18 and a TCP connection 54 has been or is set up between the mobile telephone unit 18 and the external communication unit 16. Conversion between the two protocols SPL and TCP is carried out in the mobile telephone unit 18, as described below.

The serial connection 52 is based on USB and uses the SPL protocol 56 and an accessory protocol 58. The SPL protocol 56 is based on the accessory protocol 58. An SPL header, here a first header 60, is provided according to the SPL protocol 56. Such a first header 60 contains transmission parameters, for example transmitter, receiver, data rates etc. Each message which is sent via the serial connection 52 has at least one first header 60. Pure status or service messages can consist only of a first header 60. Useful messages which are intended to be used to transport data comprise one or more data fields 62 in addition to the first header 60. These data fields 62 contain data which are transmitted from the communication unit 14 to the external communication unit 16 or from the external communication unit 16 to the communication unit 14. In this case, the SPL protocol 56 acts as a bridge solution since the communication unit 14 cannot communicate directly with the external communication unit 16 on account of different interfaces.

The TCP connection 54 uses a TCP protocol 64. The TCP protocol 64 comprises a TCP header, called a second header 66 here. Such a second header 66 contains transmission parameters or transmission data, for example transmitter, receiver, data rates etc. Each message sent via the TCP connection 54 has at least one second header 66. Pure status or service messages can consist only of a second header 66. Useful messages which are intended to be used to transport data comprise one or more data fields 62 in addition to the second header 66. These data fields 62 contain data which are transmitted from the communication unit 14 to the external communication unit 16 or from the external communication unit 16 to the communication unit 14.

Conversion between the SPL protocol 56 and the TCP protocol 64 is carried out in the mobile telephone unit 18, more precisely in the program 38 which may be an app, for example. In this case, only the headers 60, 66 are processed and the data fields 62 remain unchanged. That is to say, the data field 62 of a message or transmission according to the SPL protocol 56 corresponds exactly to the data field 62 of a message or transmission according to the TCP protocol 64.

In order to convert the headers 60, 66, both an SPL socket 40 and a TCP socket 42 are implemented in the software 38. A first header 60 coming from the communication unit 14 is received there and its transmission data are extracted and analyzed. On the basis of these transmission data, a second header 66 for the TCP protocol 64 is created by the software 38 and is transmitted to the TCP socket 42. This second header 66 is then combined with the data field(s) 62 to form a TCP-compatible message and is transmitted to the respective receiver, here the external communication unit 16.

Conversely, a second header 66 coming from the external communication unit 16 is received by the TCP socket 42. Its transmission data are extracted and analyzed. On the basis of these transmission data, a first header 60 for the SPL protocol 56 is created by the software 38 and is transmitted to the SPL socket 40. This first header 60 is then combined with the data field(s) 62 to form an SPL-compatible message and is transmitted to the respective receiver, here the communication unit 14.

The operation of setting up the communication connection is described below. In this example, the operation of setting up the connection starts from the communication unit 14, but the set-up could also start from the external communication unit 16. In a first step 68, the communication unit 14 transmits a connection request "request socket connection (SPL info)" to the mobile telephone unit 18 which then sends an open socket (TCP) request to the external communication unit 16 in a second step 70. In a third step 72, the external communication unit 16 provides a socket with the message "socket available". The mobile telephone unit 18 in turn transmits a corresponding message containing SPL information to the communication unit 14 in a fourth step 74.

In addition, the connection can be encrypted using asymmetrical encryption, for example. This can start from a security facility 48 of the external communication unit 16, for example, and can use CAI (certificate-based authentication using immobilizer), for example. A corresponding mating part is situated in a core unit or the core services 26 of the communication unit 14. A continuously encrypted HTTPS connection can therefore be provided. Overall, the entire communication connection between the two end points of the communication unit 14 and the external communication unit 16 via the mobile telephone unit 18 is very secure since the data are not processed in the mobile telephone unit 18.

Figure 2:
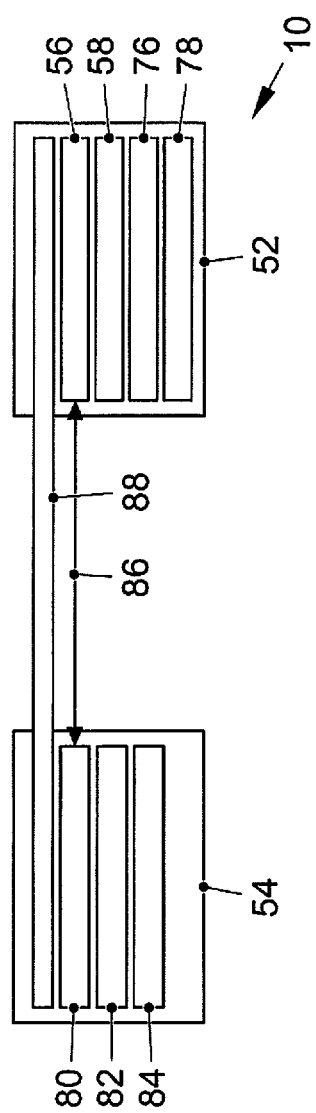
FIG. 2 shows a schematic illustration of a layer model of the communication connection of the system.

FIG. 2 shows a layer model of the communication connection. The serial connection 52 between the communication unit 14 and the mobile telephone unit 18 is based on the SPL protocol 56. The SPL protocol 56 comprises at least the first header 60 with at least one data field 62. The SPL sockets 30, 40 and the conversion between SPL and TCP in the program 38 may likewise be considered to be part of the SPL protocol 56.

In this example, the SPL protocol 56 uses an accessory protocol 58 which is based on a bulk channel 76 for transmitting byte streams of a physical USB connection 78. The SPL protocol 56 is a serial point-to-point connection with a data stream or packets containing a first or SPL header 60 and one or more data fields 62.

The connection 54 between the mobile telephone unit 18 and the external communication unit 16 is based on the TCP protocol 64. The TCP protocol 64 has an uppermost transport layer 80 and a switching layer 82 underneath which comprises a protocol called IP. Underneath, there are one or more network layers 84 which are used to implement physical access to a network.

The first or SPL header 60, or more precisely its communication instructions or information, is converted into a second or TCP header 66 by means of a conversion 86 which is carried out in the mobile telephone unit 18. The data field is transferred without change to the TCP stream and is transmitted, together with the created second or TCP header 66, to the external communication unit 16. The data stream or the conversion in the other direction from the external communication unit 16 to the communication unit 14 takes place in a similar manner.

A corresponding counterpart station or configuration is present in the interface or app of the mobile telephone unit 18, but the encryption functions and the connections to the features are not implemented there.

An HTTPS layer 88 is provided as the uppermost layer and allows continuous encryption.

Thanks to the SPL protocol 56, it is possible to provide a secure communication connection which is simple to implement with little effort, to be precise for communication participants who cannot communicate directly with one another.

DE 10 2010 007 883 A1 discloses a device for receiving and reproducing information in a vehicle, wherein, if the reception quality of a first item of information undershoots a predefinable threshold value, a transmitting and receiving means second information provided by a second information source and dependent on the type of selected first information can be retrieved.

WO 2005/004431 A2 discloses a motor vehicle multimedia system having a multimedia central station installed in a motor vehicle and a further optical display unit with graphics capability which is portable and can be wirelessly connected to the central station.

LIST OF REFERENCE SYMBOLS

10 System
12 Communication unit
14 Apparatus
16 External communication unit
18 Mobile telephone unit
20 Functionality
22 Functionality
24 Functionality
26 Core services
28 Network manager
30 SPL socket
32 Accessory Protocol Support
34 Serial interface
36 Serial interface
38 Software
40 SPL socket
42 TCP socket
44 Interface
46 Interface
48 Functionality
50 Functionality
52 Serial connection
54 TCP connection
56 SPL protocol
58 Accessory protocol
60 First header
62 Data field
64 TCP protocol
66 Second header
68 First step
70 Second step
72 Third step
74 Fourth step
76 Bulk channel
78 USB connection
80 Transport layer
82 Switching layer
84 Network layer
86 Conversion
88 HTTPS layer

The invention claimed is:

1. A method for communicating between a communication unit of an apparatus and an external communication unit via a mobile telephone unit, the method comprising:
    setting up a serial connection between the communication unit of the apparatus and the mobile telephone unit, a protocol of the serial connection having a data field and a first header;
    setting up a connection between the mobile telephone unit and the external communication unit, wherein a second header for the connection between the mobile telephone unit and the external connection is generated based on the first header in the mobile telephone unit, wherein the data field is transmitted without change from the serial connection to the connection between the mobile telephone unit and the external communication unit;
    the communication unit sending a socket request to the mobile telephone unit via the serial connection;
    the mobile telephone unit transmitting a message for providing a socket to the external communication unit via the connection between the mobile telephone unit and the external communication unit;
    the external communication unit transmitting a message relating to the provided socket to the mobile telephone unit via the connection between the mobile telephone unit and the external communication unit; and
    the mobile telephone unit transmitting a message relating to the provided socket to the communication unit via the serial connection.

2. The method of claim 1, wherein the serial connection is at least one of a Bluetooth Serial Port, an accessory protocol of the mobile telephone unit or a USB connection.

3. The method of claim 1, wherein the connection between the mobile telephone unit and the external communication unit is a TCP/IP connection.

4. The method of claim 1, wherein the connection between the mobile telephone unit and the external communication unit and/or the serial connection is/are encrypted.

5. A communication unit set up for use in an apparatus, wherein the communication unit is configured to provide communication between a communication unit of an apparatus and an external communication unit via a mobile telephone unit by:
    setting up a serial connection between the communication unit of the apparatus and the mobile telephone unit, a protocol of the serial connection having a data field and a first header;
    setting up a connection between the mobile telephone unit and the external communication unit, wherein a second header for the connection between the mobile telephone unit and the external connection is generated based on the first header in the mobile telephone unit, wherein the data field is transmitted without change from the serial connection to the connection between the mobile telephone unit and the external communication unit;

the communication unit sending a socket request to the mobile telephone unit via the serial connection;

the mobile telephone unit transmitting a message for providing a socket to the external communication unit via the connection between the mobile telephone unit and the external communication unit;

the external communication unit transmitting a message relating to the provided socket to the mobile telephone unit via the connection between the mobile telephone unit and the external communication unit; and the mobile telephone unit transmitting a message relating to the provided socket to the communication unit via the serial connection.

6. The communication unit of claim 5, wherein the serial connection is at least one of a Bluetooth Serial Port, an accessory protocol of the mobile telephone unit or a USB connection.

7. The communication unit of claim 5, wherein the connection between the mobile telephone unit and the external communication unit is a TCP/IP connection.

8. The communication unit of claim 5, wherein the connection between the mobile telephone unit and the external communication unit and/or the serial connection is/are encrypted.

9. The communication unit of claim 5, wherein the socket is provided for the serial connection.

10. The communication unit of claim 5, wherein the apparatus is a vehicle.

11. The communication unit of claim 5, wherein the apparatus is a household appliance.

12. A computer program product which can be loaded into the internal memory of a digital computer, the computer program product comprising software code components which are used to carry out a method for communicating between a communication unit of an apparatus and an external communication unit via a mobile telephone unit, when the product is executed on a computer, on a communication unit or on a mobile telephone unit, wherein the method for communicating between the communication unit of the apparatus and the external communication unit via the mobile telephone unit comprises:

setting up a serial connection between the communication unit of the apparatus and the mobile telephone unit, a protocol of the serial connection having a data field and a first header; and setting up a connection between the mobile telephone unit and the external communication unit, wherein a second header for the connection between the mobile telephone unit and the external connection is generated based on the first header in the mobile telephone unit, wherein the data field is transmitted without change from the serial connection to the connection between the mobile telephone unit and the external communication unit;

the communication unit sending a socket request to the mobile telephone unit via the serial connection;

the mobile telephone unit transmitting a message for providing a socket to the external communication unit via the connection between the mobile telephone unit and the external communication unit;

the external communication unit transmitting a message relating to the provided socket to the mobile telephone unit via the connection between the mobile telephone unit and the external communication unit; and the mobile telephone unit transmitting a message relating to the provided socket to the communication unit via the serial connection.

13. The computer program product of claim 12, wherein the serial connection is at least one of a Bluetooth Serial Port, an accessory protocol of the mobile telephone unit or a USB connection.

14. The computer program product of claim 12, wherein the connection between the mobile telephone unit and the external communication unit is a TCP/IP connection.

15. The computer program product of claim 12, wherein the connection between the mobile telephone unit and the external communication unit and/or the serial connection is/are encrypted.

16. The computer program product of claim 12, wherein a socket is provided for the serial connection.

17. The computer program product of claim 12, wherein the apparatus is a vehicle.

18. The computer program product of claim 12, wherein the apparatus is a household appliance.

* * * * *